Patented Dec. 10, 1946

2,412,550

UNITED STATES PATENT OFFICE 2,412,550

PREPARATION OF ETHYL HALIDES

Donald C. Bond, Northbrook, and Michael Savoy, Chicago, Ill., assignors to The Pure Oil Company, Chicago, Ill., a corporation of Ohio No Drawing. Application November 1, 1944, Serial No. 561,486

16 Claims. (Cl. 260—663)

1

This invention relates to the preparation of ethyl halides from ethylene or ethylene-containing gases and hydrogen halides, and is more particularly concerned with a process in which the reaction is catalyzed by means of zirconium salts.

An object of the invention is to provide a process for preparation of ethyl halides.

Another object of the invention is to provide a method for the preparation of ethyl chloride from hydrocarbon gases containing minor amounts of ethylene.

Still another object of the invention is to provide a new catalyst in the synthesis of ethyl halides fom ethylene or ethylene-containing gases and hydrogen halides.

We have discovered that not only can high yields of ethyl halides be obtained by the reaction of ethylene or ethylene-containing gases and hydrogen halides in the presence of zirconium salts, particularly zirconium tetrachloride and zirconium oxychloride, but that the life of the catalyst is extremely long as compared to the life of Friedel-Crafts catalyst such as aluminum chloride when used in the same type of synthesis.

In accordance with our process ethylene or an ethylene-containing gas, such as the gases resulting from the cracking of hydrocarbon oils, in admixture with anhydrous hydrogen halide is contacted with zirconium salt at a temperature of approximately 200–750° F., and preferably at temperatures of approximately 350–500° F., and at atmospheric or superatmospheric pressure. When operating under atmospheric pressure we prefer to operate within the limits of approximately 200–500° F. since at temperatures above 500° F. at atmospheric pressure the ethyl halides dissociate to a marked extent. If the process is carried out under superatmospheric pressure, temperatures above 500° F. may be used with good results, since the dissociation of ethyl halides is suppressed by superatmospheric pressure. Thus the higher the pressure the higher the temperature at which the reaction may be carried out.

Contact times ranging from a few seconds to several hours may be used. Where continuous operation is practiced the contact times will be relatively short particularly where unreacted material is recycled. In batch operations contact times will approach those necessary to establish equilibrium conditions.

The process may be carried out by passing the reactants through a bed of the catalyst, preferably in the form of a solid porous carrier impregnated with the zirconium salt, or the catalyst in finely divided or powder form may be suspended

2 in the reactants and subsequently separated from the reaction products and continuously recycled.

Another method of carrying out the process is to suspend or dissolve the catalyst in an inert liquid, such as nitrobenzene, which does not boil under reaction conditions, and pass the reactants through the body of liquid containing the suspended catalyst.

When charging an ethylene-containing gas, in which the ethylene is present in minor proportions, to the process, it may be desirable to mix therewith hydrogen halide in excess of the amount necessary to stoichiometrically react with the ethylene. By providing an excess of hydrogen halide a larger portion of the ethylene is caused to react than would react if the ratio of ethylene to hydrogen halide was stoichiometric. Where dilute ethylenic gas is used as charging material it is not desirable to recycle the effluent gas, as it only dilutes the fresh charging stock. Therefore it is desirable to react as much as possible of the ethylene in the charging gas before discarding it.

Where the charging gas is substantially pure ethylene it may be desirable to charge an excess of ethylene over the amount stoichiometrically necessary to react with hydrogen halide in order to completely consume the hydrogen halide and avoid recovery thereof from the effluent gas. The ethylene in the effluent gas can readily be separated from the reaction products and be recycled to the process.

In order to demonstrate the invention a catalyst was prepared by dissolving in concentrated hydrochloric acid, zirconium oxychloride, and mixing the zirconium oxychloride solution with active charcoal in such amount that 20 grams of zirconium oxychloride ($ZrOCl_2.8H_2O$) were present per 100 cc. of active charcoal. The mixture was evaporated to remove the water and was then dried at 400° F. A steel reactor having an inside diameter of approximately 1.5 inches and a length of approximately 14 inches, and a volume of 375 cc. was filled with the catalyst. Ethylene was passed through the catalyst at the rate of 0.17 cubic foot per hour admixed with anhydrous hydrogen chloride passed through the reactor at the rate of 0.21 cubic foot per hour, both measured at standard temperature and pressure. The catalyst was maintained at a temperature of 370° F. During the first hour of the run no ethyl chloride was produced. In the next interval of 2.2 hours, 9.2 grams of ethyl chloride was produced, corresponding to a conversion of 30.4% on the basis of the ethylene, and 24.7% on the basis of the hydrogen chloride.

In the next interval of 3 hours the rate of flow of ethylene was 0.18 cubic foot per hour and anhydrous hydrogen chloride was 0.17 cubic foot per hour, measured at standard temperature and pressure. During this 3 hour period 21.6 grams of ethyl chloride was produced corresponding to a conversion of 49.3% based on the ethylene charged and 42.1% based on the hydrogen chloride charged.

Under approximately the same conditions as above stated using active charcoal alone as catalyst, a conversion of about 5% based on both the ethylene and hydrogen chloride was obtained.

As another example of our process a catalyst was prepared by impregnating silica gel with zirconium oxychloride in the manner above described in connection with the impregnation of active charcoal, so that the catalyst contained 20 grams of zirconium oxychloride per 100 cc. of silica gel. Using the silica gel impregnated with zirconium oxychloride as catalyst in the same reactor as above described at a temperature of 385° F. and with a hydrogen chloride to ethylene ratio of approximately 1, and contact time of approximately 2 minutes, a conversion of 66% to ethyl chloride based on the ethylene charged and 64% on the hydrogen chloride charged over a period of 120 hours was obtained, as against a 34% conversion for active charcoal impregnated with zirconium oxychloride under the same conditions, thus demonstrating the unusual catalytic effect obtained by using silica gel as the support for the zirconium salts. During the first 12 hours of the run the conversion to ethyl chloride was 66% and 67%, respectively, and during the last 6 hours of the run the conversion to ethyl chloride was 67% and 64%, respectively, thus showing that the activity of the catalyst remained substantially constant during the entire run.

As another example of our process 35 grams of zirconium tetrachloride was mixed with 350 cc. of nitrobenzene. Ethylene and anhydrous hydrogen chloride were passed through this solution maintained at a temperature of 266° F. at a rate of 0.16 cubic foot per hour of ethylene and 0.15 cubic foot per hour of anhydrous hydrogen chloride, both measured at standard temperature and pressure. At the end of 3.5 hours 37% of ethyl chloride on the basis of the ethylene charge, and 39.7% of ethyl chloride on the basis of the hydrogen chloride charge was produced. The yield of ethyl chloride was increasing as the experiment proceeded.

Although we prefer the halides and oxyhalides of zirconium as catalysts, other salts of zirconium, such as the sulfates, nitrates and phosphates, may be used with good results.

In continuous operations contact times of approximately 1 to 10 minutes give good yields. In batch operations longer contact times may be resorted to in order to reach equilibrium conditions.

It will be seen, therefore, that we have developed a process for synthesizing ethyl halides, particularly ethyl chloride, in the presence of catalysts which have a high activity and which do not rapidly become spent during use.

It is claimed:

1. The method of preparing ethyl halides comprising contacting a mixture of an ethylene-containing gas and hydrogen halide with a zirconium salt at a temperature at which the ethylene and hydrogen halide combine.

2. Method in accordance with claim 1 in which the temperature is approximately 200–750° F. and the reaction is carried out under superatmospheric pressure.

3. Method in accordance with claim 1 in which the temperature is approximately 350–500° F.

4. Method in accordance with claim 1 in which the zirconium salt is zirconium oxychloride.

5. Method in accordance with claim 1 in which the zirconium salt is zirconium tetrachloride.

6. The method of preparing ethyl chloride comprising contacting a mixture of ethylene-containing gas and anhydrous hydrogen chloride with a catalyst comprising a zirconium salt at a temperature of approximately 200–750° F. and the reaction is carried out under superatmospheric pressure.

7. Method in accordance with claim 6 in which the salt is zirconium tetrachloride.

8. Method in accordance with claim 6 in which the salt is zirconium oxychloride.

9. Method in accordance with claim 6 in which the catalyst is a solid porous carrier impregnated with a zirconium salt.

10. Method in accordance with claim 6 in which the catalyst is active charcoal impregnated with a zirconium salt.

11. Method in accordance with claim 6 in which the catalyst is silica gel impregnated with zirconium oxychloride.

12. Method in accordance with claim 6 in which the catalyst is silica gel impregnated with zirconium tetrachloride.

13. The method of preparing ethyl chloride comprising contacting a mixture of ethylene-containing gas and anhydrous hydrogen chloride at a temperature of approximately 350–500° F. with a catalyst prepared by impregnating a solid porous carrier with a solution of zirconium oxychloride in hydrochloric acid and drying the resulting mixture.

14. Method in accordance with claim 13 in which the carrier is silica gel.

15. The method of preparing ethyl chloride comprising contacting a mixture of ethylene-containing gas and anhydrous hydrogen chloride at a temperature of approximately 350–500° F. with a catalyst prepared by impregnating a solid porous carrier with zirconium oxychloride.

16. Method in accordance with claim 15 in which the carrier is silica gel.

DONALD C. BOND.
MICHAEL SAVOY.